United States Patent [19]

Yamazaki et al.

[11] 4,118,723
[45] Oct. 3, 1978

[54] CAMERA INDICATING MEANS

[75] Inventors: Keiji Yamazaki, Sakai; Mamoru Katsuragi, Izumi, both of Japan

[73] Assignee: Minolta Camera Kabushiki Kaisha, Japan

[21] Appl. No.: 855,084

[22] Filed: Nov. 28, 1977

[30] Foreign Application Priority Data

Nov. 29, 1976 [JP] Japan ............................ 51-160360[U]

[51] Int. Cl.² ........................ G03B 17/20; G03B 19/12
[52] U.S. Cl. ........................................ 354/155; 354/53
[58] Field of Search ................................. 354/150–156, 354/202, 53, 54, 55, 57, 289, 60

[56] References Cited

U.S. PATENT DOCUMENTS

| | | | |
|---|---|---|---|
| 3,250,196 | 5/1966 | Ort et al. ................................. | 354/219 |
| 3,630,134 | 12/1971 | Nakamura ............................. | 354/155 |
| 3,657,985 | 4/1972 | Uno ....................................... | 354/155 |
| 3,890,627 | 6/1975 | Uno ....................................... | 354/155 X |
| 3,962,710 | 6/1976 | Okuno et al. ......................... | 354/225 |
| 4,037,235 | 7/1977 | Ueda ..................................... | 354/53 X |

*Primary Examiner*—Donald A. Griffin
*Attorney, Agent, or Firm*—Watson, Cole, Grindle & Watson

[57] ABSTRACT

Disclosed are exposure data indicating means for an exchangeable lens type camera which is selectively settable for operation in either a diaphragm priority automatic shutter speed control mode or a shutter speed priority automatic diaphragm control mode and which includes structure enabling indication of an *f*-number representative of an automatically controlled diaphragm aperture when the maximum *f*-number of the particular exchangeable lens mounted on the camera has been preset. The indicating means provides an indication within a finder view field of both a preset *f*-number and a preselected shutter speed when the camera is set to operate in the automatic diaphragm control mode and of only a preset *f*-number when the camera is set to operate in the automatic shutter speed control mode. The indicating means includes a view-finder and two separate optical arrangements adapted for directing light to introduce visible information relating to set *f*-number and selected shutter speed into the view-finder view field. A shutter element coupled with a manually operated exposure mode selector is operable to block one optical arrangement and thereby prevent information relating to shutter speed from being introduced into the finder view field when the mode selector is operated to set the camera in its automatic shutter speed control mode.

11 Claims, 4 Drawing Figures

CAMERA INDICATING MEANS

BACKGROUND OF THE INVENTION

1. Field of the Invention

The present invention relates to exposure data indicating means for the view-finders of cameras adapted for changeover of exposure control from shutter speed priority automatic diaphragm control mode to diaphragm priority automatic shutter speed control mode and vice versa.

2. Description of the Prior Art

In the past, the type of data indicated in the view-finder has generally depended upon whether exposure control is to be effected in a shutter speed priority mode or in a diaphragm priority mode. For instance, in the shutter speed priority mode, it has been the general practice to indicate both the set shutter speed and a preset value of an objective lens in the view finder. In general, the f-number actually required for a set shutter speed is separately indicated in the view finder by means of an exposure meter, so that in the case of a shutter speed priority mode, no meaning is derived from an indication of the preset f-number of an interexchangeable lens.

The cameras disclosed in U.S. patent application Ser. No. 804,290 filed June 7, 1977 and assigned to the same assignee, however, are adapted for selectively allowing both diaphragm priority mode operation and shutter speed priority mode operation. In such cameras, the diaphragm ring is preset to the maximum f-number to enable an indication of an anticipated automatically controlled f-number during shutter speed priority operation. These cameras include a first transmitting system for transmitting information relating to the step-difference between a minimum f-number and a set f-number for an interexchangeable lens to the camera body, and a second transmitting system for transmitting information relating to the maximum f-number of the interexchangeable lens from the lens to the camera body. Thus, information relating to the minimum inherent f-number of the interexchangeable lens may be derived. In addition, based on the minimum f-number information thus derived, information relating to the intensity of light passed through a fully open aperture, set shutter speed, and set film sensitivity, anticipated f-number for automatic control may be indicated. With cameras of this type, it is desirable, in the case of shutter speed priority operational mode, that a set f-number be indicated within the view-finder for the purpose of drawing the attention of the photographer.

In the case of diaphragm priority mode operation, it has been customary to provide an indication of an anticipated automatically controlled shutter speed in the view-finder. In this respect it would be meaningless to also indicate a set shutter speed in the view-finder since this often would confuse the photographer.

SUMMARY OF THE INVENTION

It is an important object of the present invention to provide indicating means for use in cameras of the above-described type, wherein for a selected exposure control mode of operation only necessary and minimum information relating to preset exposure factors are indicated within the finder view field.

To accomplish the above object, the present invention provides an indicating device which includes two separate optical arrangements for introducing visible information relating to shutter speed and f-number into a view finder and a shutter element for one of the optical arrangements. One of the optical arrangements is adapted to direct light for introducing visible information relating to a selected shutter speed into the finder view field while the second arrangement is adapted to direct light to introduce visible information relating to a preset f-number into said view field. The shutter element is movable between a first position in blocking relationship to the light of the first mentioned optical arrangement to prevent the information relating to a preselected shutter speed from being introduced into the finder view field and a second position out of said blocking relationship. A manually operable exposure control mode selector is coupled to the shutter element for movement of the latter into said first position when the selector is operated to set the camera in its diaphragm priority automatic shutter speed control mode.

With the above arrangement, information relating to both the set f-number and the selected shutter speed are seen within the finder view field when the camera is set in its shutter speed priority automatic diaphragm control mode. Thus, an operator looking through the finder view field can visually determine which f-number has been set as well as which shutter speed has been selected. And, if an f-number other than the maximum f-number of the particular exchangeable lens mounted on the camera has been set at this time, the operator will know that the camera has not been properly set for automatically controlled diaphragm aperture operation. On the other hand, when the camera is set for diaphragm priority automatic shutter speed control mode operation, information relating to shutter speed is concealed from the finder view field since in this mode the shutter element blocks the first optical system. Thus, only information relating to the set f-number will be seen within the finder view field and an operator will not be confused in evaluating the indicated data.

The above objects, advantages and features of the present invention will become more apparant from the following description taken in connection with the accompanying drawings.

DETAILED DESCRIPTION OF THE PREFERRED EMBODIMENT

Figure 3:
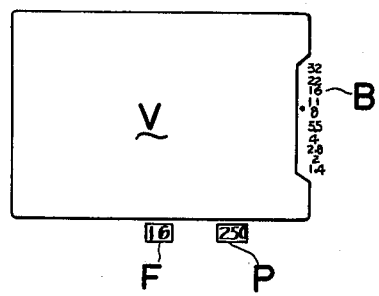
FIG. 3 is a schematic view illustrating the finder view field of a camera embodying the indicating means of the present invention where said camera is set for shutter speed priority automatic diaphragm control mode operation.
Figure 4:
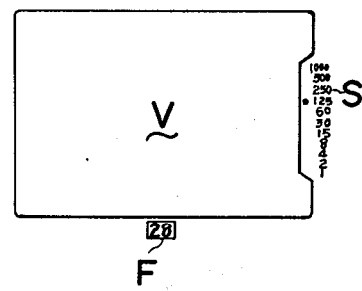
FIG. 4 is the same view as FIG. 3 except that in this case the camera is set for diaphragm priority automatic shutter speed control mode operation.

FIGS. 3 and 4 illustrate the patterns of indications in the view finder of a camera which includes indicating means according to one embodiment of the present invention. FIG. 3 illustrates the pattern for the shutter speed priority mode while FIG. 4 illustrates the pattern for the diaphragm priority mode. Reference letter F refers to the indication of f-number while the letter P refers to the indication of selected shutter speed. As can be seen in FIG. 4, shutter speed indication P is not visible. Reference letters S and B respectively refer to indications of automatically controlled shutter speed and f-number as determined by an exposure meter.

Figure 1:
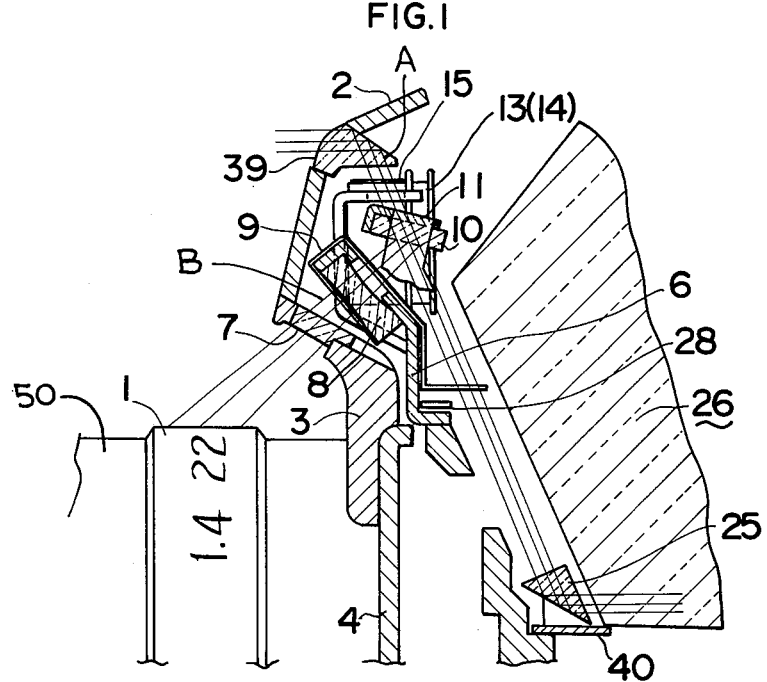
FIG. 1 is a cross-sectional view of a portion of an exchangeable lens type camera embodying indicating means constructed in accordance with the present invention.

FIG. 1 illustrates an embodiment of the invention, and shows optical paths A and B for indications F and P respectively. In this regard it should be noted that in FIG. 1, in the area beneath mirror 10, path B is directly in front of path A and as a result the paths are superimposed. The f-number indication F in the view finder of FIGS. 3 and 4 represents an image of the set one of the f-number graduation indicia on the diaphragm setting ring 1 on interexchangeable lens barrel 50. The shutter speed indication P in the view finder of FIG. 3 represents an image of the selected one of the shutter speed graduation indicia marked on ribbon 15 which is adapted to be moved in cooperation with shutter speed setting knob 23. As can be seen in FIG. 1, ribbon 15 is irradiated by external light passing through window prism 39.

With reference to FIG. 1, the illustrated camera includes an upper cover 2, a front cover 3 and a forward cover 4. Light reflected from diaphragm setting ring 1 along path B passes through window 7 provided in front cover 3 and into the interior of the camera body. Of course it should be recognized that diaphragm setting ring 1 is moveable relative to path B to change the f-number setting of the camera. The light which has passed through concave lens 8 and impinges on mirror 10 where the light is reflected and then directed by prism 25 into pentagonal view finder prism 26 to thereby produce a visual image relating to a set f-number graduation indicium of the diaphragm setting ring on eyepiece 27 in the position F as shown in FIGS. 3 and 4. An optical-path-limiting frame 9 for lens 8 is mounted on plate support 6 as illustrated. Mirror 10 is mounted on an arm 11 which is secured to plate support 6 by means of rivets.

As can be seen, ribbon 15 has a plurality of shutter speed graduation indicia in the form of numerals marked thereon and the same extends perpendicularly of the surface of the drawing in FIG. 1. Ribbon 15 is trained around an idler drum 13 and a take-up drum 14 as can best be seen in FIG. 2. Window prism 39 in upper cover 2 fully reflects ambient or external light so as to direct the same toward ribbon 15 along path A. In this regard it should be noted that ribbon 15 is disposed adjacent path A. Light transmitted through ribbon 15 advances into prism 25 where it is directed into prism 26.

Figure 2:
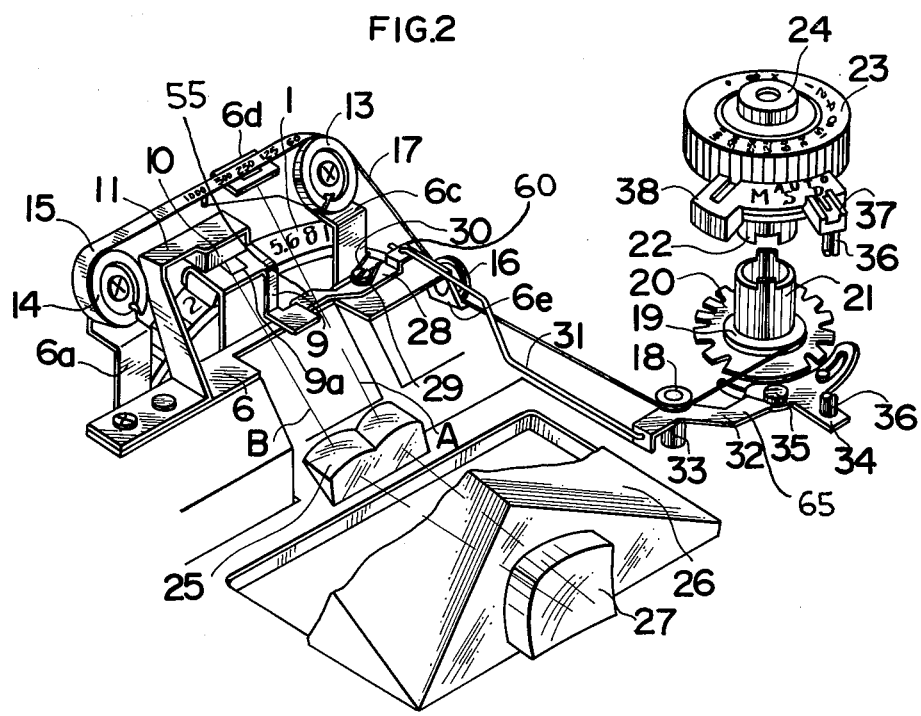
FIG. 2 is a schematic perspective view of a portion of the camera of FIG. 1.

Thus, as can be seen in FIGS. 1 and 2, window prism 39, prism 25 and prism 26 present a first optical arrangement for directing light along path A and into the view finder eyepiece 27 to thereby introduce visible information relating to a selected shutter speed into the view field of eyepiece 27 while window 7, lens 8, frame 9, mirror 10, prism 25 and prism 26 present a second optical arrangement for directing light along path B and into the view finder eyepiece 27 to thereby introduce visible information relating to a set f-number into the view field of eyepiece 27. In this connection it should be recognized that diaphragm setting ring 1 is disposed adjacent path B. Paths A and B are parallel with the result that f-number indication F and shutter speed indication P are positioned in side-by-side relationship in the view finder as illustrated in FIG. 3.

As can best be seen in FIG. 2, the camera includes a shutter speed setting knob 23 and shutter release button 24 while prism 25 has two convex light-incident surfaces, one for the light in path A and the other for the light in path B. Drums 13 and 14 are rotatably mounted on arms 6a and 6c respectively of support 6. Drum 14 is spring-loaded for counterclockwise rotation under the action of a spring which is not shown. Ribbon 15 extends from drum 14 toward drum 13 and is attached to a cable or tendon 17 which is wound around drum 13, then around a pulley 16 rotatably mounted on segment 6e of plate support 6 and next around a pulley 18. Tendon 17 is finally wound around and attached to a pulley 19 integral with a shutter speed setting click disc 20 and a coupler 21. Coupler 21 is coupled to a coupler 22 projecting downwardly from a shutter speed setting knob 23 such that knob 23 and pulley 19 rotate together. Thus, when knob 23 and therefore pulley 19 are rotated, tendon 17 is pulled and or allowed to retract under the influence of spring-loaded drum 14 to move ribbon 15 laterally between drums 14 and 15. Thus, ribbon 15 is moveable relative to path A in response to the selection of a shutter speed for the camera. As a result, an indicium representative of a selected shutter speed may be disposed in path of light A and visible information relating thereto is thus introduced into the view field of eyepiece 27. The indicium disposed in path A of course changes as knob 23 is rotated.

A shutter lever 28 is rotatably mounted on plate support 6 by means of a pin 29 for rotation in a horizontal plane. A spring 20 is disposed to contact lever 28 and urges the latter in a clockwise direction. As shutter lever 28 rotates about pin 29, end 55 thereof is moved into and out of optical path of light A. The opposite end 60 of lever 28 is coupled via connecting rod 31 to an intermediate lever 32. Intermediate lever 32 is mounted for rotation about pivot pin 33 in a horizontal plane. As can be seen from FIG. 2, rotation of lever 32 about pivot 33 causes end 55 of lever 28 to move into and out of optical path A. As will be recognized by those skilled in the art, when end 55 is out of opitcal path A, shutter speed information will be seen in eyepiece 27. However, when end 55 is disposed in blocking relationship to path A, the information carried thereby will be blocked and will not be seen in eyepiece 27.

An operating knob 37 is used for changing the camera from one exposure control mode to another. Knob 37 is coupled to a sliding plate 34 by a depending pin 36 (shown fragmentarily) secured to knob 37 and to plate 34. Thus, when knob 37 is shifted, sliding plate 34 is moved in the same direction. FIG. 2 illustrates the camera as set for shutter speed priority automatic diaphragm control mode of operation. At this time, the indications shown in the view finder are as illustrated in FIG. 3. When knob 37 is moved to the left and aligned with graduation S on a mode index 38, the camera will be set for diaphragm priority automatic shutter speed mode of operation. When knob 37 is moved, plate 34 is also moved to the left and pin 35 on plate 34 is moved into contact with the right-hand end 65 of intermediate lever 32 whereby the latter is rotated in a clockwise direction. Thus, connecting rod 31 is pushed and shutter lever 28 is rotated in a counterclockwise direction. As a result, the left-hand end 55 of lever 28 moves into blocking relationship to optical path A and the shutter speed information disappears from the view finder, to provide an indication pattern as shown in FIG. 4.

We claim:

1. Indicating means for an exchangeable lens type camera which is selectively settable to operate in either a diaphragm priority automatic shutter speed control mode or a shutter speed priority automatic diaphragm control mode and which includes structure to enable indication of an f-number representative of the automatically controlled diaphragm aperture when the maximum f-number of an exchangeable lens mounted on said camera has been preset in the camera operating mechanism, said indicating means comprising:
   a view-finder;
   a first optical arrangement for directing light to introduce visible information relating to a selected shutter speed into the view field of said view-finder;
   a second optical arrangement for directing light to introduce visible information relating to a set f-number into the view field of said view-finder;
   a manually operable exposure mode selector for selectively setting said camera for operation in said diaphragm priority automatic shutter speed control mode and in said shutter speed priority automatic diaphragm control mode; and
   a shutter element movable between a first position in blocking relationship to the light of said first optical arrangement to prevent information relating to a preselected shutter speed from being introduced into the view field of said view-finder and a second position out of said blocking relationship to permit introduction of said information relating to a preselected shutter speed into said view field,
   said shutter element being coupled to said exposure mode selector for movement thereby into said first position when said exposure mode selector is operated to set said camera in said diaphragm priority automatic shutter speed control mode and into said second position when said selector is operated to set said camera in said shutter speed priority automatic diaphragm control mode.

2. An indicating device as set forth in claim 1 wherein said first optical arrangement includes first optical means for directing said shutter speed information introducing light along a first optical path into said view-finder and a member carrying shutter speed graduation indicia disposed adjacent said first path, said shutter speed member being movable relative to said first path in response to the selection of a shutter speed for said camera so that an indicium representative of the selected shutter speed is registered in said first path.

3. An indicating device as set forth in claim 2 wherein said second optical arrangement includes second optical means for directing said f-number information introducing light along a second optical path into said view-finder and a member carrying f-number graduation indicia disposed adjacent said second path, said f-number member being movable relative to said second path to change the f-number setting of said camera and to register an indicium representative of the set f-number in said second path.

4. An indicating device as set forth in claim 3 wherein said camera includes a camera housing, wherein said shutter speed member is disposed in said camera housing, and wherein said first optical arrangement includes a window disposed on said housing in said first path providing access for ambient light for use as said shutter speed information introducing light.

5. An indicating device as set forth in claim 4 wherein said f-number indicia carrying member is disposed exteriorly of said housing for exposure to ambient light.

6. An indicating device as set forth in claim 5 wherein said camera operating means includes diaphragm opening setting means mounted on said exchangeable lens, said diaphragm opening setting means including said f-number graduation indicia carrying member.

7. An indicating device as set forth in claim 6 wherein said view-finder includes a pentagonal prism having a front wall, wherein said second optical arrangement includes a reflecting mirror disposed above said pentagonal prism for reflecting light from said f-number graduation indicia carrying member downwardly along said second path and wherein said first and second optical arrangements include a common prism disposed ahead of said pentagonal prism in each of said paths for directing light reflected from said reflecting mirror and light passing through said window into said pentagonal prism through said front wall.

8. An indicating device as set forth in claim 3 wherein said camera includes a camera housing and wherein said f-number indicia carrying member is disposed exteriorly of said camera housing for exposure to ambient light.

9. An indicating device as set forth in claim 2 wherein said camera includes a camera housing, wherein said shutter speed member is disposed in said camera housing, and wherein said first optical arrangement includes a window disposed on said housing in said first path providing access for ambient light for use as said shutter speed information introducing light.

10. An indicating device as set forth in claim 1 wherein said second optical arrangement includes second optical means for directing said f-number information introducing light along a second optical path into said view-finder and a member carrying f-number graduation indicia disposed adjacent said second path, said f-number member being movable relative to said second path to change the f-number setting of said camera and to register an indicium representative of the set f-number in said second path.

11. An indicating device as set forth in claim 10, wherein said camera includes a camera housing and wherein said f-number indicia carrying member is disposed exteriorly of said camera housing for exposure to ambient light.

* * * * *